(12) United States Patent
Kumar et al.

(10) Patent No.: US 11,517,016 B2
(45) Date of Patent: Dec. 6, 2022

(54) AGROCHEMICAL COMBINATIONS

(71) Applicant: UPL LTD, West Bengal (IN)

(72) Inventors: Ajit Kumar, Mumbai (IN); Jaidev Rajnikant Shroff, Dubai (AE); Vikram Rajnikant Shroff, Dubai (AE)

(73) Assignee: UPL LTD., West Bengal (IN)

( * ) Notice: Subject to any disclaimer, the term of this patent is extended or adjusted under 35 U.S.C. 154(b) by 45 days.

(21) Appl. No.: 16/642,428

(22) PCT Filed: Sep. 15, 2018

(86) PCT No.: PCT/IB2018/057087
§ 371 (c)(1),
(2) Date: Feb. 27, 2020

(87) PCT Pub. No.: WO2019/058244
PCT Pub. Date: Mar. 28, 2019

(65) Prior Publication Data
US 2020/0253207 A1 Aug. 13, 2020

(30) Foreign Application Priority Data
Sep. 23, 2017 (IN) .............. 201731033800

(51) Int. Cl.
*A01N 43/56* (2006.01)
*A01N 37/46* (2006.01)
*A01N 41/10* (2006.01)
*A01N 43/713* (2006.01)
*A01N 47/14* (2006.01)
*A01N 59/00* (2006.01)
*A01N 59/16* (2006.01)

(52) U.S. Cl.
CPC .............. *A01N 43/56* (2013.01); *A01N 37/46* (2013.01); *A01N 41/10* (2013.01); *A01N 43/713* (2013.01); *A01N 47/14* (2013.01); *A01N 59/00* (2013.01)

(58) Field of Classification Search
CPC ........ A01N 43/56; A01N 37/46; A01N 41/10; A01N 43/713; A01N 47/14; A01N 59/00
See application file for complete search history.

(56) References Cited

U.S. PATENT DOCUMENTS

| 7,696,232 B2 | 4/2010 | Berger et al. |
| 2012/0015047 A1 | 1/2012 | Vanden Berghe |
| 2014/0148493 A1 | 5/2014 | Tamura et al. |
| 2017/0071199 A1* | 3/2017 | Baur ............... A01N 41/10 |

FOREIGN PATENT DOCUMENTS

| CN | 102365970 A | 3/2012 |
| CN | 102726410 A | 10/2012 |
| CN | 102791128 A | 11/2012 |
| CN | 103329924 A | 10/2013 |
| CN | 103461333 A | 12/2013 |
| CN | 103651466 A | 3/2014 |
| CN | 103518769 B | 1/2015 |
| JP | H01305003 A | 12/1989 |
| JP | 2000169461 A | 6/2000 |
| JP | 2011126837 A | 6/2011 |
| WO | 2019058244 A1 | 3/2019 |

OTHER PUBLICATIONS

CN102726410—Machine Translation, May 7, 2014 retrieved Jul. 9, 2021, IP.com, pp. 1-18 (Year: 2014).*
International Search Report and Written Opinion; Internatioinal Application No. PCT/IB2018/057087; International Filing Date Sep. 15, 2018; dated Nov. 13, 2018; 10 pages.
International Search Report and Written Opinion for International Application PCT/IB2020/056209; International Filing Date: Jul. 1, 2020; dated Sep. 8, 2020; 11 pages.

* cited by examiner

*Primary Examiner* — Trevor Love
(74) *Attorney, Agent, or Firm* — Cantor Colburn LLP

(57) ABSTRACT

A combination comprising at least one diamide insecticide; and at least a silicic acid based plant health promoting additive, and a composition comprising the same.

4 Claims, No Drawings

AGROCHEMICAL COMBINATIONS

CROSS REFERENCE TO RELATED APPLICATIONS

This application is a National Stage application of PCT/IB2018/057087, filed Sep. 15, 2018, which claims the benefit of Indian Application No. 201731033800, filed Sep. 23, 2017, both of which are incorporated by reference in their entirety herein.

TECHNICAL FIELD

The present invention relates to combinations comprising a diamide insecticide in combination with fungicidally active compounds and plant health promoting agents. The said combination is highly suitable for controlling unwanted animal pests, such as insects, acaricides and/or nematodes, and unwanted phytopathogenic fungi.

BACKGROUND OF THE INVENTION

An insecticide is a substance used to kill insects. They include ovicides and larvicides used against insect eggs and larvae, respectively.

Diamides insecticides are relatively new group of insecticides which includes flubendiamide, a highly potent lepidoptericide, and chlorantraniliprole and its analogue cyantraniliprole. Evolution of diamides can be studied in article published Pest Manag Sci. 2013 January; 69(1):7-14.

Chlorantraniliprole and cyantraniliprole are anthranilic diamide insecticidal compounds which exhibit larvicidal activity as an orally ingested toxicant by targeting and disrupting the $Ca^{2+}$ balance and ryanodine receptor. Fungicides are an integral and important tool yielded by farmers to control diseases, as well as to improve yields and quality of the crops. There are various fungicides that have been developed over the years with many desirable attributes such as specificity, systemicity, curative and eradicant action and high activity at low use rates.

Various other classes of fungicides are also known in the art, such as Quinone outside inhibitors (QoIs), ergosterol-biosynthesis inhibitors, fungicides that act on multiple sites, fungicides that affect mitosis etc.

Dithiocarbamates are known in the art as multi-site fungicides. These fungicides are used for broad-spectrum disease control in more than 70 crops. Mancozeb is especially important for controlling devastating and fast spreading diseases such as *Phytophthora infestans, Venturia inaequalis* etc. Dithiocarbamate fungicides, especially mancozeb, are particularly useful for disease control because of their broad spectrum of activity, high tolerance by crop plants, and general usefulness for controlling fungal plant diseases not controlled by active compounds that act on only a single target site in the fungus.

Various plant health promoting agents are known in the art including fertilizers, biologicals as well as plant additives that can promote growth as well as improve yield of the plant. The element silica is the second most abundant element in the earths crust. There are various studies that have been conducted that prove the importance of silica in the growth of plants. Studies have also demonstrated that silica is taken up in the same amount as any other known micronutrient (Role of Orthosilicic Acid (OSA) Based Formulation in Improving Plant Growth and Development, Jain et.al, Silicon (2016)). There are many silica based fertilizers and plant growth promoters known in the art. However, none have been mixed with combination of fungicides and insecticides.

U.S. Pat. No. 7,696,232 B2 discloses composition comprising Chlorantaniliprole and other actives which includes fungicides.

There is therefore a need in the art for combinations of anthranilamide insecticidal compounds with fungicides and plant health promoters that help improve spectrum as well as promote greater plant health, and improve yield. With crop tolerances decreasing, lower use rates being imposed and resistance being increasingly observed, there is a need for a combination of actives that allows for broader disease control spectrum and improved plant health that combines curative and preventive actives and has a lower dosage.

Therefore, embodiments of the present invention may ameliorate one or more of the above mentioned problems:

Therefore, embodiments of the present invention may provide combinations of insecticide, fungicides and plant health promoters that possess an enhanced efficacy over the individual active compound used in isolation.

Another object of the present invention is to provide combinations of insecticides, fungicides and plant health promoters that causes an enhanced greening of the crops to which it is administered.

Another object of the present invention is to provide a combination that when applied to the locus of a plant results in increased yield of the crop.

Yet another object of the present invention is to provide a combination that results into reduced fungal disease incidence in the crops to which it is applied.

Another object of the present invention is to provide a combination that achieves increased yield in the crops to which it is applied.

Another object of the present invention is to provide a combination that causes an enhanced insecticidal activity.

Another object of the present invention is to provide a combination which enhances the protection to plants from attack or infestation by insects, acarids or nematodes.

Another object of the present invention is to provide a synergist for the anthranilamide insecticides.

Some or all these and other objects of the invention are can be achieved by way of the invention described hereinafter.

SUMMARY OF THE INVENTION

Thus, an aspect of the present invention can provide a combination comprising: at least one diamide insecticide selected from broflanilide, chlorantraniliprole, cyantraniliprole, cyclaniliprole, cyhalodiamide, flubendiamide and tetraniliprole; and at least one plant health promoting agent.

Another aspect of the present invention can provide a composition comprising: at least one diamide insecticide selected from broflanilide, chlorantraniliprole, cyantraniliprole, cyclaniliprole, cyhalodiamide, flubendiamide and tetraniliprole; at least one plant health promoting agent; and at least one agrochemically acceptable excipient.

Another aspect of the present invention can provide a combination comprising: at least one multi-site fungicide; at least one diamide insecticide selected from broflanilide, chlorantraniliprole, cyantraniliprole, cyclaniliprole, cyhalodiamide, flubendiamide and tetraniliprole; and at least one plant health promoting agent.

Another aspect of the present invention can provide a composition comprising: at least one multi-site fungicide; at least one diamide insecticide selected from broflanilide, chlorantraniliprole, cyantraniliprole, cyclaniliprole, cyhalodiamide, flubendiamide and tetraniliprole; at least one plant health promoting agent; and at least one agrochemically acceptable excipient.

Another aspect of the present invention can provide a combination comprising: at least one dithiocarbamate fungicide; at least one diamide insecticide selected from broflanilide, chlorantraniliprole, cyantraniliprole, cyclaniliprole, cyhalodiamide, flubendiamide and tetraniliprole; and at least one plant health promoting agent.

Another aspect of the present invention can provide a composition comprising: at least one dithiocarbamate fungicide; at least one diamide insecticide selected from broflanilide, chlorantraniliprole, cyantraniliprole, cyclaniliprole, cyhalodiamide, flubendiamide and tetraniliprole; at least one plant health promoting agent; and at least one agrochemically acceptable excipient.

Yet another aspect of the present invention can provide a combination comprising: at least one multi-site fungicide; at least one diamide insecticide selected from broflanilide, chlorantraniliprole, cyantraniliprole, cyclaniliprole, cyhalodiamide, flubendiamide and tetraniliprole; at least one plant health promoting agent; and at least a third agrochemical active.

Yet another aspect of the present invention can provide a composition comprising: at least one multi-site fungicide; at least one diamide insecticide selected from broflanilide, chlorantraniliprole, cyantraniliprole, cyclaniliprole, cyhalodiamide, flubendiamide and tetraniliprole; at least one plant health promoting agent; at least a third agrochemical active; and at least one agrochemically acceptable excipient.

DETAILED DESCRIPTION

The term 'disease control' as used herein denotes control and prevention of a disease. Controlling effects include all deviation from natural development, for example: killing, retardation, decrease of the fugal disease. The term 'plants' refers to all physical parts of a plant, including seeds, seedlings, saplings, roots, tubers, stems, stalks, foliage and fruits. The term "locus" of a plant as used herein is intended to embrace the place on which the plants are growing, where the plant propagation materials of the plants are sown or where the plant propagation materials of the plants will be placed into the soil. The term "plant propagation material" is understood to denote generative parts of a plant, such as seeds, vegetative material such as cuttings or tubers, roots, fruits, tubers, bulbs, rhizomes and parts of plants, germinated plants and young plants which are to be transplanted after germination or after emergence from the soil. These young plants may be protected before transplantation by a total or partial treatment by immersion. The term "agriculturally acceptable amount of active" refers to an amount of an active that kills or inhibits the plant disease for which control is desired, in an amount not significantly toxic to the plant being treated.

Surprisingly, the insecticidal and/or acaricidal and/or antimicrobial activity or the fungicidal activity and/or the plant-invigorating activity and/or the yield-enhancing activity of the active compound combinations according to the invention was found to be significantly higher than the sum of the activities of the individual active compounds.

It has surprisingly been found that the addition of a plant health promoting additive to a diamide insecticide synergistically enhances the efficacy of the diamide insecticide. Therefore, the insecticidal activity of the diamide insecticide in the presence of a plant health promoting agent of the present invention was surprisingly higher than in the absence of the plant health promoting agent.

It has further surprisingly been found that the addition of a plant health promoting additive to a combination of a multi-site fungicide, preferably a dithiocarbamate fungicide, and diamide insecticide compounds resulted in surprising and unexpected advantages. It was surprising that the addition of a plant health promoter such as a silicic acid based additive when combined with a multi-site fungicide and a diamide insecticides resulted in an enhancement of the efficacy, and a surprising reduction in fungal disease incidence and enhanced pest control in comparison to the efficacy seen only with the combination of diamide insecticides with at least another fungicide. It has further been found that the addition of a plant health promoting additive to a combination of a multisite fungicide and a diamide insecticide led to better greening in the crop as well as greater yield from the crop to which they were applied.

These surprising advantages of the combinations of the invention were not observed when the multisite fungicide, preferably the dithiocarbamate fungicide, was not present in the combination or when the health promoting additive was not added to the combination. Therefore, these unexpected advantages of the combination of the present invention could be attributed to the inclusion of a plant health promoting additive, or to a combination of a dithiocarbamate fungicide, and a diamide insecticide with the plant health promoting additive.

Thus, in an aspect, the present invention provides a combination comprising:
  (a) at least one diamide insecticide selected from broflanilide, chlorantraniliprole, cyantraniliprole, cyclaniliprole, cyhalodiamide, flubendiamide and tetraniliprole; and
  (b) at least a silicic acid based plant health promoting additive.

In another aspect, the present invention provides a combination comprising:
  (a) at least one diamide insecticide selected from broflanilide, chlorantraniliprole, cyantraniliprole, cyclaniliprole, cyhalodiamide, flubendiamide and tetraniliprole;
  (b) at least one multisite fungicide; and
  (c) at least a silicic acid based plant health promoting additive.

In an embodiment, the plant health promoting additive according to the present invention is a silicic acid based additive selected from those having the general formula:

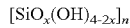

$[SiO_x(OH)_{4-2x}]_n$

Such silicic acids may be selected from metasilicic acid ($H_2SiO_3$), orthosilicic acid ($H_4SiO_4$), disilicic acid ($H_2Si_2O_5$), and pyrosilicic acid ($H_6Si_2O_7$); preferably orthosilicic acid, more specifically stabilised orthosilicic acid.

In an embodiment, the plant health promoting additive is ortho-silicic acid.

In an embodiment, the combination of the present invention comprises at least one diamide insecticide selected from broflanilide, chlorantraniliprole, cyantraniliprole, cyclaniliprole, cyhalodiamide, flubendiamide and tetraniliprole.

In an embodiment, the diamide insecticide is chlorantraniliprole.

In an embodiment, the diamide insecticide is cyantraniliprole.

In an embodiment, the diamide insecticide is flubendiamide.

In an embodiment, the combinations of the present invention comprise a multisite fungicide.

In an embodiment, the multi-site fungicide is selected from the group consisting of dithiocarbamates, phthalimides, chloronitriles, inorganic fungicides, sulfamides, bisguanidines, triazines, quinones, quinoxalines, dicarboxamides and mixtures thereof.

In an embodiment, the multi-site fungicide is selected from the class of dithiocarbamate fungicides selected from asamobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

In an embodiment, the multi-site fungicide is a phthalimide fungicide selected from captan, captafol and folpet.

In an embodiment, the multi-site fungicide is a chloronitrile fungicide such as chlorothalonil.

In an embodiment, the multi-site fungicide is a sulfamide fungicide selected from dichlofluanid and tolylfluanid.

In an embodiment, the multi-site fungicide is a bisguanidine fungicide selected from guazatine and iminoctadine.

In an embodiment, the multi-site fungicide is a triazine fungicide selected from anilazine.

In an embodiment, the multi-site fungicide is a quinone fungicide selected from dithianon.

In an embodiment, the multi-site fungicide is a quinoxaline fungicide selected from quinomethionate and chlorquinox.

In an embodiment, the multi-site fungicide is a dicarboxamide fungicide selected from fluoroimide.

In an embodiment, the multi-site fungicide is an inorganic fungicide selected from copper fungicides including copper (II) hydroxide, copper oxychloride, copper (II) sulfate, basic copper sulfate, Bordeaux mixture, copper salicylate $C_7H_4O_3$*Cu, cuprous oxide $CU_2O$; or sulphur.

In an embodiment, the combination of the present invention may comprise at least a second fungicide or insecticide apart from the multisite fungicide.

In an embodiment, the second insecticide is a combination of at least two more insecticide.

In this embodiment, these insecticides are referred to herein as the second and the third insecticide respectively. However, the second and the third insecticide are not the same insecticides, although they can be a combination of two insecticides from the same class of insecticides.

In an embodiment, the second and/or third fungicide in the combinations of the present invention may be individually selected from from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof.

Thus in an embodiment, the Acetylcholinesterase (AChE) inhibitors (C) may be selected from the group consisting of carbamates such as Alanycarb (C1), Aldicarb (C2), Bendiocarb (C3), Benfuracarb (C4), Butocarboxim (C5), Butoxycarboxim (C6), Carbaryl (C7), Carbofuran (C8), Carbosulfan (C9), Ethiofencarb (C9), Fenobucarb (C10), Formetanate (C11), Furathiocarb (C12), Isoprocarb (C13), Methiocarb (C14), Methomyl (C15), Metolcarb (C16), Oxamyl (C17) Pirimicarb (C18), Propoxur (C19), Thiodicarb (C20), Thiofanox (C21), Triazamate (C22), Trimethacarb (C23), XMC (C24), Xylylcarb Organophosphates such as Acephate (C25), Azamethiphos (C26), Azinphos-ethyl (C27), Azinphos-methyl (C28), Cadusafos (C29), Chlorethoxyfos (C30), Chlorfenvinphos (C31), Chlormephos (C32), Chlorpyrifos (C33), Chlorpyrifos-methyl (C34), Coumaphos (C35), Cyanophos (C36), Demeton-S-methyl (C37), Diazinon (C38), Dichlorvos/DDVP (C39), Dicrotophos (C40), Dimethoate (C41), Dimethylvinphos (C42), Disulfoton (C43), EPN (C44), Ethion (C45), Ethoprophos (C46), Famphur (C47), Fenamiphos (C48), Fenitrothion (C49), Fenthion (C50), Fosthiazate (C51), Heptenophos (C52), Imicyafos (C53), Isofenphos (C54), Isopropyl O-(methoxyaminothio-phosphoryl) salicylate (C55), Isoxathion (C56), Malathion (C57), Mecarbam (C58), Methamidophos (C59), Methidathion (C60), Mevinphos (C61), Monocrotophos (C62), Naled (C63), Omethoate (C64), Oxydemeton-methyl (C65), Parathion (C66), Parathion-methyl (C67), Phenthoate (C68), Phorate (C69), Phosalone (C70), Phosmet (C71), Phosphamidon (C72), Phoxim (C73), Pirimiphos-methyl (C74), Profenofos (C75), Propetamphos (C76), Prothiofos (C77), Pyraclofos (C78), Pyridaphenthion (C79), Quinalphos (C80), Sulfotep (C81), Tebupirimfos (C82), Temephos (C83), Terbufos (C84), Tetrachlorvinphos (C85), Thiometon (C86), Triazophos (C87), Trichlorfon (C87), Vamidothion (C88) and mixtures thereof.

In an embodiment, the preferred Acetylcholinesterase (AChE) inhibitors may be selected from thiodicarb (C20), methomyl (C15), acephate (C25), and quinalphos (C80).

In another embodiment, the GABA -gated chloride channel blockers may be selected from Chlordane (C89), Endosulfan (C90), Ethiprole (C91), Fipronil (C92) and mixtures thereof.

The preferred GABA gated chloride channel blocker may be fipronil (C92).

In an embodiment, the Sodium channel modulators may be selected from Pyrethroids such as acrinathrin (C93), allethrin (C94), bioallethrin (C95), esdépalléthrine (C96), barthrin (C97), bifenthrin (C98), kappa-bifenthrin (C99), bioethanomethrin (C100), brofenvalerate (C101), brofluthrinate (C102), bromethrin (C103), butethrin (C104), chlorempenthrin (C105), cyclethrin (C106), cycloprothrin (C107), cyfluthrin (C108), beta-cyfluthrin (C109), cyhalothrin (C110), gamma-cyhalothrin (C111), lambda-cyhalothrin (C112), cypermethrin (C113), alpha-cypermethrin (C114), beta-cypermethrin (C115), theta-cypermethrin (C116), zeta-cypermethrin (C116), cyphenothrin (C117), deltamethrin (C118), dimefluthrin (C119), dimethrin (C120), empenthrin (C121), d-fanshiluquebingjuzhi (C122), chloroprallethrin (123), fenfluthrin (C124), fenpirithrin (C125), fenpropathrin (C126), fenvalerate (C127), esfenvalerate (C128), flucythrinate (C129), fluvalinate (C129), tau-fluvalinate (C130), furamethrin (C131), furethrin (C132), heptafluthrin (C133), imiprothrin (C134), japothrins (C135), kadethrin (136), methothrin (C137), metofluthrin (C138), epsilon-metofluthrin (C139), momfluorothrin (C140), epsilon-momfluorothrin (C141), pentmethrin (C142), permethrin (C143), biopermethrin (C144), transpermethrin (C145), phenothrin (C146), prallethrin (C147), profluthrin (C148), proparthrin (C149), pyresmethrin (C150), renofluthrin (151), meperfluthrin (C152), resmethrin (C153), bioresmethrin (C154), cismethrin (C155), tefluthrin (C156), kappa-tefluthrin (C157), terallethrin (C158), tetramethrin (C159), tetramethylfluthrin (C160), tralocythrin (C161), tralomethrin (C162), transfluthrin (C163), valerate (C164), etofenprox (C165), flufenprox (C166), halfenprox (C167), protrifenbute (C168), silafluofen (C169), sulfoxime ((RS)-[1-(4-chlorophenyl)-2-(methylthio)-1-propanone] (EZ)-O-(3-phenoxybenzyl)oxime] (C170), thiofluoximate (C171) or DDT (C172), Methoxychlor (C173), natural pyrethrins such as cinerin-I (C174), cinerin-II (C175), jasmolin-I (C176), jasmolin-II (C177), pyrethrin-I (C178) and pyrethrin-II (C179) or mixtures thereof.

The preferred Sodium channel modulator may be bifenthrin (C98), kappa-bifenthrin (C99), gamma-cyhalothrin (C111), lambda-cyhalothrin (C112), cypermethrin (C113), alpha-cypermethrin (C114), beta-cypermethrin (C115), theta-cypermethrin (C116), zeta-cypermethrin (C116), fenpropathrin (C126), permethrin (C143) and mixtures thereof.

In an embodiment, the nicotinic acetylcholine receptor (nAChR) competitive modulators may be selected from Neonicotinoids such as Acetamiprid (C180), Clothianidin (C181), Dinotefuran (C182), Imidacloprid (C183), Nitenpyram (C184), Thiacloprid (C185), Thiamethoxam (C186); Sulfoximines such as sulfoxaflor (185); Butenolides such as Flupyradifurone (C186); Mesoionics such as Triflumezopyrim (C186) and mixtures thereof.

The preferred nicotinic acetylcholine receptor (nAChR) competitive modulators may be Acetamiprid (C180), Clothianidin (C181), Imidacloprid (C183), Thiacloprid (C185), Thiamethoxam (C186), sulfoxaflor (185).

In an embodiment, the Nicotinic acetylcholine receptor (nAChR) allosteric modulators may be selected from Spinosyns such as Spinetoram (C187), Spinosad (C188) and mixtures thereof.

The preferred Nicotinic acetylcholine receptor (nAChR) allosteric modulators may be Spinosad (C188).

In an embodiment, the Glutamate gated chloride channel (GluCl) allosteric modulators such as Avermectins selected from Abamectin (C189), Emamectin benzoate (C190), Lepimectin (C191) and Milbemycins such as Milbemectin (C192), milbemycin A3 (C193), Milbemycin A4 (C194), Mildiomycin (C195) and mixtures thereof.

The preferred Glutamate gated chloride channel (GluCl) allosteric modulators may be abamectin (C189).

In an embodiment, the Juvenile hormone mimics may be selected from Hydroprene (C196), Kinoprene(C197), Methoprene (C198), Fenoxycarb (C199), Pyriproxyfen (C200) and mixtures thereof.

The preferred juvenile hormone mimic may be Pyriproxyfen (C200).

In an embodiment, the Miscellaneous nonspecific (multisite) inhibitor insecticides may be selected from Methyl bromide and the like, Chloropicrin (C201), Cryolite (Sodium aluminum fluoride) (C202), Sulfuryl fluoride (C203), Borax (C204), Boric acid (C205), Disodium octaborate (C206), Sodium borate (C207), Sodium metaborate (C208), Tartar emetic (C209), Dazomet (C210), Metam (C211) and mixtures thereof.

In an embodiment, the Chordotonal organ TRPV channel modulators may be selected from Pymetrozine (C212), Pyrifluquinazon (C213) and mixtures thereof.

In an embodiment, Mite growth inhibitors may be selected from Clofentezine (C214), Diflovidazin (C215), Hexythiazox (C216), Etoxazole (C217) and mixtures thereof.

In an embodiment, Microbial disruptors of insect midgut membranes may be selected from *Bacillus thuringiensis* subsp. *Israelensis* (C218), *Bacillus thuringiensis* subsp. *Aizawai* (C219), *Bacillus thuringiensis* subsp. *Kurstaki* (C219), *Bacillus thuringiensis* subsp. *Tenebrionis* (C220), B.t. crop proteins such as Cry1Ab (C221), Cry1Ac (C222), Cry1Fa (C223), Cry1A.105 (224), Cry2Ab (C225), Vip3A (C226), mCry3A (C227), Cry3Ab (C228), Cry3Bb (C229), Cry34Ab1/Cry35Ab1 (C230), *Bacillus sphaericus* (C231) and the like.

In an embodiment, Inhibitors of mitochondrial ATP synthase may be selected from Diafenthiuron (C232), Azocyclotin (C233), Cyhexatin (C234), Fenbutatin oxide (C235), Propargite (236), Tetradifon (C237) and mixtures thereof.

In an embodiment, Uncouplers of oxidative phosphorylation via disruption of the proton gradient may be selected from Chlorfenapyr (C238), DNOC (C239), Sulfluramid (C240) and mixtures thereof.

In an embodiment. Nicotinic acetylcholine receptor (nAChR) channel blockers may be selected from Bensultap (C241), Cartap hydrochloride (C242), Thiocyclam (C243), Thiosultap-sodium (C244) and mixtures thereof.

In an embodiment, Inhibitors of chitin biosynthesis may be selected from Bistrifluron (C245), Chlorfluazuron (C246), Diflubenzuron (C247), Flucycloxuron (C248), Flufenoxuron (C249), Hexaflumuron (C250), Lufenuron (C251), Novaluron (C252), Noviflumuron (C253), Teflubenzuron (C254), Triflumuron (C255), Buprofezin (C256) and mixtures thereof.

The preferred Inhibitors of chitin biosynthesis may be Novaluron (C252), Chlorfluazuron (C246), Lufenuron (C251), Buprofezin (C256).

In an embodiment, moulting disruptors may be selected from cyromazine (C257) and the like.

In an embodiment, Ecdysone receptor agonists may be selected from Chromafenozide (C258), Halofenozide (C259), Methoxyfenozide (C260), Tebufenozide (C261) and mixtures thereof.

The preferred Ecdysone receptor agonists may be selected from Methoxyfenozide (C260).

In an embodiment, Octopamine receptor agonists may be selected from amitraz (C262) and the like.

In an embodiment, Mitochondrial complex electron transport inhibitors may be selected from Hydramethylnon (C263), Acequinocyl (C264), Fluacrypyrim (C265), Bifenazate (C266), Fenazaquin (C267), Fenpyroximate (C268), Pyridaben (C269), Pyrimidifen (C270), Tebufenpyrad (C271), Tolfenpyrad (C272), Rotenone (C273), Aluminium phosphide (C274), Calcium phosphide (C275), Phosphine (C276), Zinc phosphide (C277), Calcium cyanide (C278), Potassium cyanide (C279), Sodium cyanide (280), Cyenopyrafen (C281), Cyflumetofen (C282), Pyflubumide (C283) and mixtures thereof.

The preferred mitochondrial complex electron transport inhibitors may be Bifenazate (C266), Fenpyroximate (C268), Pyridaben (C269), Tebufenpyrad (C270), Tolfenpyrad (C271).

In an embodiment, Voltage-dependent sodium channel blockers may be selected from Indoxacarb (C272), Metaflumizone (C273) and mixtures thereof.

In an embodiment, Inhibitors of acetyl CoA carboxylase may be selected from Tetronic and Tetramic acid derivatives such as Spirodiclofen (C274), Spiromesifen (C275), Spirotetramat (C276) and, Spiropidion (C277) mixtures thereof.

In an embodiment, Chordotonal organ Modulators—undefined target site may be selected from Flonicamid (C278) and the like.

In an embodiment, the biopesticide may be selected from botanical insecticides such as azadirectin A (C279), euginol (C280), neem oil (C281), toosendanin (C282), 1-cinnamoyl-3-feruoyl-11-hydroxymeliacarpin (C283), volkensin (C284), d-limonene (C285), menthol, (C286) 1,8-cineole (C287), citronellal (C288), eugenol (C289), p-menthane-3, 8-diol (C290), thymol (C291) and the like and mixtures thereof.

In an embodiment, the second fungicide is a combination of at least two more fungicides. In this embodiment, these fungicides are referred to herein as the second and the third fungicide respectively. However, the second and the third fungicide are never the same fungicides, although they can be a combination of two fungicides from the same class of fungicides.

In an embodiment, the second and/or third fungicide in the combinations of the present invention may be individually selected from nucleic acids synthesis inhibitors, cytoskeleton and motor protein inhibitors, amino acids and protein synthesis inhibitors, respiration process inhibitors, signal transduction inhibitors, lipid synthesis and membrane integrity distruptors, sterol biosynthesis inhibitors, melanin synthesis inhibitors, cell wall biosynthesis inhibitors, host plant defence inductors and/or fungicides with unknown modes of action.

Thus, in an embodiment, the nucleic acid synthesis inhibitor fungicide may be selected from acylalanines such as benalaxyl, benalaxyl-M (kiralaxyl), furalaxyl, metalaxyl, metalaxyl-M (mefenoxam), oxazolidinones such as oxadixyl, butyrolactones such as ofurace, hydroxy-(2-amino-) pyrimidines such as bupirimate, dimethirimol, ethirimol, isoxazoles such as hymexazole, isothiazolones such as octhilinone, carboxylic acids such as oxolinic acid.

In an embodiment, the cytoskeleton and motor protein inhibitors may be benzimidazoles such as benomyl, carbendazim, fuberidazole, thiabendazole; thiophanates such as thiophanate, thiophanate-methyl; N-phenyl carbamates such as diethofencarb; toluamides such as zoxamide; thiazole carboxamides such as ethaboxam; phenylureas such as pencycuron, benzamides such as fluopicolide; cyanoacrylates such as phenamacril.

In an embodiment, the respiration process inhibitor fungicides may be selected from pyrimidinamines such as diflumetorim; pyrazole-5-carboxamides such as tolfenpyrad, strobilurins such as azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl, dimoxystrobin, fenaminostrobin, metominostrobin, trifloxystrobin, famoxadone, fluoxastrobin, fenamidone, pyribencarb and mixtures thereof; oxazolidine-diones such as famoxadone; Imidazolinones such as fenamidone; benzyl-carbamates such as pyribencarb; N-methoxy-(phenyl-ethyl)-pyrazole-carboxamides such as Pyrimidinamines such as diflumetorim; cyano-imidazole such as cyazofamid; sulfamoyl-triazole such as amisulbrom; dinitrophenyl crotonates such as binapacryl, meptyldinocap, dinocap; 2,6-dinitro-anilines such as fluazinam; pyr.-hydrazones such as ferimzone; tri-phenyl tin compounds such as fentin acetate, fentin chloride, fentin hydroxide; thiophene-carboxamides such as silthiofam; triazolo-pyrimidylamine such as ametoctradin.

In an embodiment, amino acids and protein synthesis inhibitor fungicides may be selected from anilino-pyrimidines such as cyprodinil, mepanipyrim, pyrimethanil, antibiotic fungicides such as blasticidin-S, kasugamycin, streptomycin, oxytetracycline and the like.

In an embodiment, signal transduction inhibitor fungicides may be selected from aryloxyquinolines such as quinoxyfen; quinazolinones such as proquinazid; phenylpyrroles such as fenpiclonil, fludioxonil; dicarboximides such as chlozolinate, dimethachlone, iprodione, procymidone and vinclozolin.

In an embodiment, the fungicide may be selected from lipid synthesis and membrane integrity distruptors such as phosphoro-thiolates such as edifenphos, Iprobenfos, pyrazophos; dithiolanes such as isoprothiolane; aromatic hydrocarbons such as biphenyl, chloroneb, dicloran, quintozene (PCNB), tecnazene (TCNB), tolclofos-methyl and the like; 1,2,4-thiadiazoles such as etridiazole; carbamates such as iodocarb, propamocarb, prothiocarb and the like.

Thus in an embodiment, the sterol biosynthesis inhibitors may be selected from triazoles such as azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, piperazines such as triforine; pyridines such as pyrifenox, pyrisoxazole; pyrimidines such as fenarimol, nuarimol imidazoles such as imazalil, oxpoconazole, pefurazoate, prochloraz, triflumizole; morpholines such as aldimorph, dodemorph, fenpropimorph, tridemorph and the like; piperidines such as fenpropidin, piperalin; spiroketalamines such as spiroxamine; hydroxyanilides such as fenhexamid; amino-pyrazolinones such as fenpyrazamine; thiocarbamates such as pyributicarb; allylamines such as naftifine, terbinafine and mixtrues thereof.

In an embodiment, cell wall biosynthesis inhibitor fungicides may be selected from peptidyl pyrimidine nucleoside fungicides such as polyoxin, cinnamic acid amides such as dimethomorph, flumorph, pyrimorph; valinamide carbamates such as benthiavalicarb, iprovalicarb, valifenalate; mandelic acid amides such as mandipropamid and mixtures thereof.

In an embodiment, melanin synthesis inhibitor fungicide may be selected from isobenzo-furanone such as fthalide; pyrrolo-quinolinones such as pyroquilon; triazolobenzo-thiazoles such as tricyclazole; cyclopropane-carboxamides such as carpropamid; carboxamides such as diclocymet; propionamides such as fenoxanil; trifluoroethyl-carbamates such as tolprocarb; and mixtures thereof.

In an embodiment, host plant defence inductors fungicides may be selected from benzo-thiadiazoles such as acibenzolar-S-methyl; benzisothiazoles such as probenazole; thiadiazole-carboxamides such as tiadinil, isotianil; polysaccharides such as laminarin; and mixtures thereof.

In an embodiment, the additional second or third fungicide is a fungicide with unknown mode of action and may be selected from cyanoacetamide-oximes such as cymoxanil; ethyl phosphonates such as foestyl —Al, phophorous acid and salts; phthalamic acids such as teclofthalam; benzotriazines such as triazoxide; benzene-sulphonamides such as flusulfamide; pyridazinones such as diclomezine; thiocarbamates such as methasulfocarb; phenyl-acetamides such as cyflufenamid; aryl-phenyl-ketones such as metrafenone, pyriofenone; guanidines such as dodine; cyano-methylene-thiazolidines such as flutianil; pyrimidinone-hydrazones such as ferimzone; piperidinyl-thiazole-isoxazolines such as oxathiapiprolin; 4-quinolyl-acetates such as tebufloquin; tetrazolyloximes such as picarbutrazox; glucopyranosyl antibiotics such as validamycin; fungicides such as mineral oil, organic oils, potassium bicarbonate and mixtures thereof.

In a preferred embodiment, the second fungicide in the combinations of the present invention may be selected from ergosterol biosynthesis inhibitors and Quinone outside (Qo) inhibitors.

In another preferred embodiment, the second fungicide and the third fungicide in the combinations of the present invention may be ergosterol biosynthesis inhibitors and Quinone outside (Qo) inhibitors respectively.

The ergosterol biosynthesis inhibitors may be selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, imazalil, oxpoconazole, pefurazoate, prochloraz, triflumizole, fenarimol, nuarimol, pyrifenox, pyrisoxazole, and triforine.

In another embodiment, the ergosterol biosynthesis inhibitors may be selected from prothioconazole, tebuconazole, hexaconazole, cyroconazole or epoxiconazole.

In an embodiment, the third fungicide may be a Quinone outside (Qo) inhibitor fungicide selected from azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl, dimoxystrobin, fenaminostrobin, metominostrobin, trifloxystrobin, famoxadone, fluoxastrobin, fenamidone, and pyribencarb.

In an embodiment, the Quinone outside (Qo) inhibitor fungicide may be selected from azoxystrobin, picoxystrobin, kresoxim-methyl, pyraclostrobin and trifloxystrobin.

In an embodiment, the present invention provides a combination comprising:
(a) at least one diamide insecticide selected from broflanilide, chlorantraniliprole, cyantraniliprole, cyclaniliprole, cyhalodiamide, flubendiamide and tetraniliprole;
(b) at least one multisite fungicide; and
(c) at least a silicic acid based plant health promoting additive.

In an embodiment, the present invention provides a combination comprising:
(a) at least one diamide insecticide selected from broflanilide, chlorantraniliprole, cyantraniliprole, cyclaniliprole, cyhalodiamide, flubendiamide and tetraniliprole;
(b) at least one multisite fungicide; and
(c) at least a silicic acid based plant health promoting additive; and
(d) at least a first systemic fungicide and a second systemic fungicide.

In an embodiment, the multisite fungicide may be selected from:
(i) copper fungicides selected from copper oxychloride, copper sulfate, copper hydroxide and tribasic copper sulfate (Bordeaux mixture);
(ii) elemental sulfur;
(iii) dithiocarbamate fungicides selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb;
(iv) phthalimide fungicides selected from folpet, captan and captafol;
(v) chlorothalonil;
(vi) sulfamide fungicides selected from dichlofluanid and tolylfluanid;
(vii) guanidine fungicides selected from dodine, guazantine and iminoctaadine;
(viii) anilazine;
(ix) dithianon; and
(x) combinations thereof;

In an embodiment, the first and second systemic fungicides are preferably different from each other.

In an embodiment, when the multi-site contact fungicide is a combination of mancozeb and chlorothalonil, the preferred systemic fungicide is at least one systemic fungicide selected from quinone outside inhibitor, quinone inside inhibitor, demethylation inhibitor or a succinate dehydrogenase inhibitor.

In a preferred embodiment, the first and second systemic fungicides are selected from different classes of systemic fungicides. For example:
(i) when the first systemic fungicide is a demethylation inhibitor, the second systemic fungicide is selected from a quinone outside inhibitor, a quinone inside inhibitor and succinate dehydrogenase inhibitor; or when
(ii) the first systemic fungicide is a quinone outside inhibitor, the second systemic fungicide is selected from a quinone inside inhibitor, demethylation inhibitor and succinate dehydrogenase inhibitor; or when
(iii) the first systemic fungicide is a quinone inside inhibitor, the second systemic fungicide is selected from a quinone outside inhibitor, a demethylation inhibitor and a succinate dehydrogenase inhibitor; or when
(iv) the first systemic fungicide is a succinate dehydrogenase inhibitor, the second systemic fungicide is selected from a quinone outside inhibitor, a quinone inside inhibitor and a demethylation inhibitor.

In an embodiment, the present invention provides a combination comprising:
(a) at least one diamide insecticide selected from broflanilide, chlorantraniliprole, cyantraniliprole, cyclaniliprole, cyhalodiamide, flubendiamide and tetraniliprole;
(b) at least one multisite fungicide; and
(c) at least a silicic acid based plant health promoting additive;
(d) a first systemic fungicide selected from a quinone outside inhibitor, a quinone inside inhibitor, demethylation inhibitor and succinate dehydrogenase inhibitor; and
(e) a second systemic fungicide selected from a quinone outside inhibitor, a quinone inside inhibitor, demethylation inhibitor and succinate dehydrogenase inhibitor; such that (a) when the first systemic fungicide is a demethylation inhibitor, the second systemic fungicide is selected from a quinone outside inhibitor, a quinone inside inhibitor and succinate dehydrogenase inhibitor; or when (b) the first systemic fungicide is a quinone outside inhibitor, the second systemic fungicide is selected from a quinone inside inhibitor, demethylation inhibitor and succinate dehydrogenase inhibitor; or when (c) the first systemic fungicide is a quinone inside inhibitor, the second systemic fungicide is selected from a quinone outside inhibitor, a demethylation inhibitor and a succinate dehydrogenase inhibitor; or when (d) the first systemic fungicide is a succinate dehydrogenase inhibitor, the second systemic fungicide is selected from a quinone outside inhibitor, a quinone inside inhibitor and a demethylation inhibitor; or (e) when the multi-site contact fungicide is a combination of mancozeb and chlorothalonil, the systemic fungicide is at least one of a quinone outside inhibitor, a quinone inside inhibitor, a succinate dehydrogenase inhibitor and a demethylation inhibitor.

In a preferred embodiment, the preferred quinone outside inhibitor is a strobilurin fungicide and the preferred demethylation inhibitor is a conazole fungicide. In this embodiment, the preferred dithiocarbamate is selected from the group consisting of thiram, ziram, mancozeb, maneb, metiram, propineb and zineb.

In an embodiment, the quinone outside inhibitor may be selected from fenamidone, famoxadone, and a strobilurin fungicide selected from the group consisting of azoxystrobin, mandestrobin, coumoxystrobin, enoxastrobin, flufenoxystrobin, pyraoxystrobin, dimoxystrobin, enestrobin, fluoxastrobin, kresoxim-methyl, metominostrobin, orysastrobin, picoxystrobin, pyrametostrobin, triclopyricarb, fenaminstrobin, pyraclostrobin and trifloxystrobin.

In an embodiment, the quinone inside inhibitor may be selected from cyazofamid and amisulbrom.

In an embodiment, the demethylation inhibitor may be selected from triflumizole, triforine, pyridinitrile, pyrifenox, fenarimol, nuarimol, triarimol and a conazole fungicide selected from the group consisting of climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P.

In an embodiment, the succinate dehydrogenase inhibitor may be selected from the group consisting of benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid.

In an embodiment, the second insecticidal compound in the combinations of the present invention may be selected from Acetylcholinesterase (AChE) inhibitors, GABA-gated chloride channel blockers, Sodium channel modulators, Nicotinic acetylcholine receptor (nAChR) competitive modulators, Nicotinic acetylcholine receptor (nAChR) allosteric modulators, Glutamate-gated chloride channel (GluCl) allosteric modulators, Juvenile hormone mimics, Chordotonal organ TRPV channel modulators, Mite growth inhibitors, Microbial disruptors of insect midgut membranes, Inhibitors of mitochondrial ATP synthase, Uncouplers of oxidative phosphorylation via disruption of the proton gradient, Nicotinic acetylcholine receptor (nAChR) channel blockers, Inhibitors of chitin biosynthesis, Moulting disruptors, Ecdysone receptor agonists, Octopamine receptor agonists, Mitochondrial complex electron transport inhibitors, Voltage-dependent sodium channel blockers, Inhibitors of acetyl CoA carboxylase, Chordotonal organ Modulators, multi-site miscellaneous insecticides, bioinsecticides and mixtures thereof In an embodiment, the present combinations may additionally contain other plant health promoting additives such as fertilizers, micronutrients, biological additives etc. that are known to enhance the growth and health of the plant.

In an embodiment of the combinations of the present invention, the preferred multisite fungicide is mancozeb and the preferred diamide insecticidal compound is chlorantraniliprole and the plant health additive is stabilised orthosilicic acid.

In an embodiment of the combinations of the present invention, the preferred diamide insecticidal compound is Cyantraniliprole.

In an embodiment of the combinations of the present invention, the preferred diamide insecticidal compound is Flubendiamide.

The combinations of the present invention may be formulated in the form of a composition.

In an embodiment, the present invention may provide a composition composition comprising:
 a. at least one diamide insecticide;
 b. at least a silicic acid based plant health promoting additive; and
 c. at least one agrochemically acceptable excipient.

In an embodiment, the present invention may provide a composition comprising:
 d. at least one diamide insecticide;
 e. at least one multi-site fungicide;
 f. at least a silicic acid based plant health promoting additive; and
 g. at least one agrochemically acceptable excipient.

In a preferred embodiment, the present invention may provide a composition comprising:
 (a) at least one diamide insecticidal compound;
 (b) at least one dithiocarbamate fungicide;
 (c) stabilised orthosilicic acid; and
 (d) at least one agrochemically acceptable excipient.

In an embodiment, the present invention may provide a composition comprising:
 (a) at least one diamide insecticidal compound;
 (b) at least one dithiocarbamate fungicide;
 (c) stablished orthosilicic acid;
 (d) at least one fungicide or insecticide other than the diamide insecticide or the dithiocarbamate fungicide; and
 (e) at least one agrochemically acceptable excipient.

In an embodiment, the present invention may provide a composition comprising:
 (a) at least one diamide insecticidal compound;
 (b) at least one dithiocarbamate fungicide;
 (c) stablaised orthosilicic acid;
 (d) at least one other health promoting additive selected from fertlizers, micronutrients, mycorizha, biological additves that enhance plant growth; and
 (e) at least one agrochemically acceptable excipient.

The amount of a composition according to the invention to be applied, will depend on various factors, such as the subject of the treatment, such as, for example plants, soil or seeds; the type of treatment, such as, for example spraying, dusting or seed dressing; the purpose of the treatment, such as, for example prophylactic or therapeutic disease control; in case of disease control the type of fungi to be controlled or the application time. This amount of the combinations of the present invention to be applied can be readily deduced by a skilled agronomist.

Thus in an embodiment, the present invention may provide compositions comprising:
 (a) at least one diamide insecticide selected from broflanilide, chlorantraniliprole, cyantraniliprole, cyclaniliprole, cyhalodiamide flubendiamide, tetraniliprole;
 (b) stabilised orthosilicic acid; and
 (c) at last one dithiocarbamate fungicide.

In an embodiment, the total amount of diamide insecticidal compound in the composition may typically be in the range of 0.1 to 99% by weight, preferably 0.2 to 90% by weight. The total amount of dithiocarbamate fungicide in the composition may be in the range of 0.1 to 99% by weight. The total amount of silicic acid based plant heath promoting additive in the composition may be in the range of 0.1 to 99% by weight. The total amount of second fungicide/insecticide/plant growth additive in the composition may be in the range of 0.1 to 99% by weight.

In an embodiment, the constituent of the combination of the present invention may be admixed in ratio of (1-80):(1-80):(1-80) of the dithiocarbamate fungicide, anthranilamide insecticidal compound and the silicic acid based plant health additive respectively.

In an embodiment, the constituents of the composition of the present invention may be tank mixed and sprayed at the locus of the infection, or may be alternatively be mixed with surfactants and then sprayed.

In an embodiment, the constituents of the composition of the present invention may be used for foliar application, ground or applications to plant propagation materials.

In an embodiment, the compositions of the present invention may typically be produce by mixing the actives in the composition with an inert carrier, and adding surfactants and other adjuvants and carriers as needed and formulated into solid, or liquid formulations, including but not limited to wettable powders, granules, dusts, Soluble (liquid) concentrates, suspension concentrates, oil in water emulsion, water in oil emulsion, emulsifiable concentrates, capsule suspensions, ZC formulations, oil dispersions or other known formulation types. The composition may also be used for treatment of a plant propagation material such as seeds etc.

Examples of the solid carrier used in formulation include fine powders or granules such as minerals such as kaolin clay, attapulgite clay, bentonite, montmorillonite, acid white clay, pyrophyllite, talc, diatomaceous earth and calcite; natural organic materials such as corn rachis powder and walnut husk powder; synthetic organic materials such as urea; salts such as calcium carbonate and ammonium sulfate; synthetic inorganic materials such as synthetic hydrated silicon oxide; and as a liquid carrier, aromatic hydrocarbons such as xylene, alkylbenzene and methylnaphthalene; alcohols such as 2-propanol, ethyleneglycol, propylene glycol, and ethylene glycol monoethyl ether; ketones such as acetone, cyclohexanone and isophorone; vegetable oil such as soybean oil and cotton seed oil; petroleum aliphatic hydrocarbons, esters, dimethylsulfoxide, acetonitrile and water.

Examples of the surfactant include anionic surfactants such as alkyl sulfate ester salts, alkylaryl sulfonate salts, dialkyl sulfosuccinate salts, polyoxyethylene alkylaryl ether phosphate ester salts, lignosulfonate salts and naphthalene sulfonate formaldehyde polycondensates; and nonionic surfactants such as polyoxyethylene alkyl aryl ethers, polyoxyethylene alkylpolyoxypropylene block copolymers and sorbitan fatty acid esters and cationic surfactants such as alkyltrimethylammonium salts.

Examples of the other formulation auxiliary agents include water-soluble polymers such as polyvinyl alcohol and polyvinylpyrrolidone, polysaccharides such as Arabic gum, alginic acid and the salt thereof, CMC (carboxymethyl-cellulose), Xanthan gum, inorganic materials such as aluminum magnesium silicate and alumina sol, preservatives, coloring agents and stabilization agents such as PAP (acid phosphate isopropyl) and BHT.

The compositions according to the present invention is effective for the following plant diseases:

Disease in rice: Blast (*Magnaporthe grisea*), Helminthosporium leaf spot (*Cochliobolus miyabeanus*), sheath blight (*Rhizoctonia solani*), and bakanae disease (*Gibberella fujikuroi*).

Diseases in wheat: powdery mildew (*Erysiphe graminis*), Fusariuin head blight (*Fusarium graminearum, F. avenacerum, F. culmorum, Microdochium nivale*), rust (*Puccinia striiformis, P. graminis, P. recondita*), pink snow mold (*Micronectriella nivale*), Typhula snow blight (*Typhula* sp.), loose smut (*Ustilago tritici*), bunt (*Tilletia caries*), eyespot (*Pseudocercosporella herpotrichoides*), leaf blotch (*Mycosphaerella graminicola*), glume blotch (*Stagonospora nodorum*), septoria, and yellow spot (*Pyrenophora tritici-repentis*).

Diseases of barley: powdery mildew (*Erysiphe graminis*), Fusarium head blight (*Fusarium graminearum, F. avenacerum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and *Rhizoctonia* damping-off (*Rhizoctonia solani*).

Diseases in corn: smut (*Ustilago maydis*), brown spot (*Cochliobolus heterostrophus*), copper spot (*Gloeocercospora sorghi*), southern rust (*Puccinia polysora*), gray leaf spot (*Cercospora zeae-maydis*), white spot (*Phaeosphaeria mydis* and/or *Pantoea ananatis*) and Rhizoctonia damping-off (*Rhizoctonia solani*).

Diseases of citrus: melanose (*Diaporthe citri*), scab (*Elsinoe fawcetti*), penicillium rot (*Penicillium digitatum, P. italicum*), and brown rot (*Phytophthora parasitica, Phytophthora citrophthora*).

Diseases of apple: blossom blight (*Monilinia mali*), canker (*Valsa ceratosperma*), powdery mildew (*Podosphaera leucotricha*), Alternaria leaf spot (*Alternaria alternata* apple pathotype), scab (*Venturia inaequalis*), powdery mildew, bitter rot (*Colletotrichum acutatum*), crown rot (*Phytophtora cactorum*), blotch (*Diplocarpon mali*), and ring rot (*Botryosphaeria berengeriana*).

Diseases of pear: scab (*Venturia nashicola, V. pirina*), powdery mildew, black spot (*Alternaria alternata* Japanese pear pathotype), rust (*Gymnosporangium haraeanum*), and phytophthora fruit rot (*Phytophtora cactorum*).

Diseases of peach: brown rot (*Monilinia fructicola*), powdery mildew, scab (*Cladosporium carpophilum*), and phomopsis rot (*Phomopsis* sp.).

Diseases of grape: anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), botrytis, and downy mildew (*Plasmopara viticola*).

Diseases of Japanese persimmon: anthracnose (*Gloeosporium kaki*), and leaf spot (*Cercospora kaki, Mycosphaerella nawae*).

Diseases of gourd: anthracnose (*Colletotrichum lagenarium*), powdery mildew (*Sphaerotheca fuliginea*), gummy stem blight (*Mycosphaerella melonis*), Fusarium wilt (*Fusarium oxysporum*), downy mildew (*Pseudoperonospora cubensis*), Phytophthora rot (*Phytophthora* sp.), and damping-off (*Pythium* sp.).

Diseases of tomato: early blight (*Alternaria solani*), leaf mold (*Cladosporium fulvum*), and late blight (*Phytophthora infestans*).

Diseases of eggplant: brown spot (*Phomopsis vexans*), and powdery mildew (*Erysiphe cichoracearum*) Diseases of cruciferous vegetables: Alternaria leaf spot (*Alternaria japonica*), white spot (*Cercosporella brassicae*), clubroot (*Plasmodiophora brassicae*), and downy mildew (*Peronospora parasitica*).

Diseases of onion: rust (*Puccinia allii*), and downy mildew (*Peronospora destructor*).

Diseases of soybean: purple seed stain (*Cercospora kikuchii*), sphaceloma scad (*Elsinoe glycines*), pod and stem blight (*Diaporthe phaseolorum* var. *sojae*), septoria brown spot (*Septoria glycines*), frogeye leaf spot (*Cercospora sojina*), rust (*Phakopsora pachyrhizi*), Yellow rust, brown stem rot (*Phytophthora sojae*), and Rhizoctonia damping-off (*Rhizoctonia solani*).

Diseases of kidney bean: anthracnose (*Colletotrichum lindemthianum*). Diseases of peanut: leaf spot (*Cercospora personata*), brown leaf spot (*Cercospora arachidicola*) and southern blight (*Sclerotium rolfsii*).

Diseases of garden pea: powdery mildew (*Erysiphe pisi*), and root rot (*Fusarium solani* f. sp. *pisi*).

Diseases of potato: early blight (*Alternaria solani*), late blight (*Phytophthora infestans*), pink rot (*Phytophthora erythroseptica*), and powdery scab (*Spongospora subterranean* f. sp. *subterranea*).

Diseases of strawberry: powdery mildew (*Sphaerotheca humuli*), and anthracnose (*Glomerella cingulata*).

Diseases of tea: net blister blight (*Exobasidium reticulatum*), white scab (*Elsinoe leucospila*), gray blight (*Pestalotiopsis* sp.), and anthracnose (*Colletotrichum theae-sinensis*).

Diseases of tobacco: brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Diseases of rapeseed: sclerotinia rot (*Sclerotinia sclerotiorum*), and Rhizoctonia damping-off (*Rhizoctonia solani*). Diseases of cotton: Rhizoctonia damping-off (*Rhizoctonia solani*).

Diseases of sugar beet: Cercospora leaf spot (*Cercospora beticola*), leaf blight (*Thanatephorus cucumeris*), Root rot (*Thanatephorus cucumeris*), and Aphanomyces root rot (*Aphanomyces cochlioides*).

Diseases of rose: black spot (*Diplocarpon rosae*), powdery mildew (*Sphaerotheca pannosa*), and downy mildew (*Peronospora sparsa*). Diseases of chrysanthemum and asteraceous plants: downy mildew (*Bremia lactucae*), leaf blight (*Septoria chrysanthemi-indici*), and white rust (*Puccinia horiana*).

Diseases of various groups: diseases caused by *Pythium* spp. (*Pythium aphanidermatum, Pythium debarianum, Pythium graminicola, Pythium irregulare, Pythium ultimum*), gray mold. (*Botrytis cinerea*), and Sclerotinia rot (*Sclerotinia sclerotiorum*).

Disease of Japanese radish: Alternaria leaf spot (*Alternaria brassicicola*).

Diseases of turfgrass: dollar spot (*Sclerotinia homeocarpa*), and brown patch and large patch (*Rhizoctonia solani*).

Disease of banana: Black sigatoka (*Mycosphaerella fijiensis*), Yellow sigatoka (*Mycosphaerella musicola*).

Disease of sunflower: downy mildew (*Plasmopara halstedii*).

Seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp.

Viral diseases of various plants mediated by *Polymixa* spp. or *Olpidium* spp. and so on.

In an embodiment the insect pests controlled by the combinations of the present invention may belong to the class Insecta, Arachnida and Nematoda. Exemplary pests may include: from the order Lepidoptera, pests such as *Acleris* spp., *Adoxophyes* spp., *Aegeria* spp., *Agrotis* spp., *Alabama argillaceae*, *Amylois* spp., *Anticarsia gemmatalis*, *Archips* spp., *Argyrotaenia* spp., *Autographa* spp., *Busseola fusca*, *Cadra cautella*, *Carposina nipponensis*, *Chilo* spp., *Choristoneura* spp., *Clysia ambiguella*, *Cnaphalocrocis* spp., *Cnephasia* spp., *Cochylis* spp., *Coleophora* spp., *Crocidolomia* spp., *Cryptophlebia leucotreta*, *Crysodeixis includens*, *Cydia* spp., *Diatraea* spp., *Diparopsis castanea*, *Earias* spp., *Elasmopalpus* spp., *Ephestia* spp., *Eucosma* spp., *Eupoecilia ambiguella*, *Euproctis* spp., *Euxoa* spp., *Grapholita* spp., *Hedya nubiferana*, *Heliothis* spp., *Hellula undalis*, *Hyphantria cunea*, *Keiferia lycopersicella*, *Leucoptera scitella*, *Lithocollethis* spp., *Lobesia botrana*, *Lymantria* spp., *Lyonetia* spp., *Malacosoma* spp., *Mamestra brassicae*, *Manduca sexta*, *Operophtera* spp., *Ostrinia nubilalis*, *Pammene* spp., *Pandemis* spp., *Panolis flammea*, *Pectinophora gossypiella*, *Phthorimaea operculella*, *Pieris rapae*, *Pieris* spp., *Plutella xylostella*, *Prays* spp., *Scirpophaga* spp., *Sesamia* spp., *Sparganothis* spp., *Spodoptera* spp., *Synanthedon* spp., *Thaumetopoea* spp., *Tortrix* spp., *Trichoplusia ni* and *Yponomeuta* spp.; from the order Coleoptera, pest such as *Agriotes* spp., *Anthonomus* spp., *Atomaria linearis*, *Ceutorhynchus* spp., *Chaetocnema tibialis*, *Cosmopolites* spp., *Curculio* spp., *Dermestes* spp., *Diabrotica* spp., *Epilachna* spp., *Eremnus* spp., *Gonocephalum* spp., *Heteronychus* spp., *Leptinotarsa decemlineata*, *Lissorhoptrus* spp., *Melolontha* spp., *Orycaephilus* spp., *Otiorhynchus* spp., *Phlyctinus* spp., *Phyllotreta* spp., *Popillia* spp., *Protostrophus* spp., *Psylliodes* spp., *Rhizopertha* spp., *Scarabeidae*, *Sitophilus* spp., *Sitotroga* spp., *Tenebrio* spp., *Tribolium* spp. and *Trogoderma* spp.; from the order Orthoptera, pests such as *Blatta* spp., *Blattella* spp., *Gryllotalpa* spp., *Leucophaea maderae*, *Locusta* spp., *Periplaneta* spp. and *Schistocerca* spp.; from the order Isoptera, pests such as *Reticulitermes* spp.; from the order Psocoptera pest such as, *Liposcelis* spp.; from the order Anoplura, pests such as *Haematopinus* spp., *Linognathus* spp., *Pediculus* spp., *Pemphigus* spp. and *Phylloxera* spp.; from the order Mallophaga pests such as *Damalinea* spp. and *Trichodectes* spp.; rom the order Thysanoptera, pests such as *Frankliniella* spp., *Hercinothrips* spp., *Taeniothrips* spp., *Thrips palmi*, *Thrips tabaci* and *Scirtothrips aurantii*; from the order Heteroptera, pests such as *Dichelops melacanthus*, *Distantiella theobroma*, *Dysdercus* spp., *Euchistus* spp., *Eurygaster* spp., *Leptocorisa* spp., *Nezara* spp., *Piesma* spp., *Rhodnius* spp., *Sahlbergella singularis*, *Scotinophara* spp. and *Triatoma* spp.; from the order Homoptera, insect pests such as *Aleurothrixus floccosus*, *Aleyrodes brassicae*, *Aonidiella* spp., *Aphididae*, *Aphis* spp., *Aspidiotus* spp., *Bemisia tabaci*, *Ceroplaster* spp., *Chrysomphalus aonidium*, *Chrysomphalus dictyospermi*, *Coccus hesperidum*, *Empoasca* spp., *Eriosoma larigerum*, *Erythroneura* spp., *Gascardia* spp., *Laodelphax* spp., *Lecanium corni*, *Lepidosaphes* spp., *Macrosiphus* spp., *Myzus* spp., *Nephotettix* spp., *Nilaparvata* spp., *Paratoria* spp., *Pemphigus* spp., *Planococcus* spp., *Pseudaulacaspis* spp., *Pseudococcus* spp., *Psylla* spp., *Pulvinaria aethiopica*, *Quadraspidiotus* spp., *Rhopalosiphum* spp., *Saissetia* spp., *Scaphoideus* spp., *Schizaphis* spp., *Sitobion* spp., *Trialeurodes vaporariorum*, *Trioza erytreae* and *Unaspis citri*; from the order Hymenoptera, insect pests such as *Acromyrmex*, *Athalia rosae*, *Atta* spp.,

*Cephus* spp., *Diprion* spp., *Diprionidae, Gilpinia polytoma, Hoplocampa* spp., *Lasius* spp., *Monomorium pharaonis, Neodiprion* spp., *Solenopsis* spp. and *Vespa* spp.; from the order Diptera, insect pests such as *Antherigona soccata, Bibio hortulanus, Ceratitis* spp., *Chrysomyia* spp., *Culex* spp., *Cuterebra* spp., *Dacus* spp., *Delia* spp., *Drosophila melanogaster, Liriomyza* spp., *Melanagromyza* spp., *Orseolia* spp., *Oscinella frit, Pegomyia hyoscyami, Phorbia* spp., *Rhagoletis pomonella, Sciara* spp.; from the order Acarina, pests such as *Acarus siro, Aceria sheldoni, Aculus schlechtendali, Amblyomma* spp., *Argas* spp., *Brevipalpus* spp., *Bryobia praetiosa, Calipitrimerus* spp., *Chorioptes* spp., *Dermanyssus gallinae, Eotetranychus carpini, Eriophyes* spp., *Hyalomma* spp., *Olygonychus pratensis, Ornithodoros* spp., *Panonychus* spp., *Phyllocoptruta* spp. (such as *Phyllocoptruta oleivora*), *Polyphagotarsonemus latus, Psoroptes* spp., *Rhipicephalus* spp., *Rhizoglyphus* spp., *Sarcoptes* spp., *Tarsonemus* spp. and *Tetranychus* spp.; and from the class Nematoda, the species of *Meloidogyne* spp. (for example, *Meloidogyne incoginita* and *Meloidogyne javanica*), *Heterodera* spp. (for example, *Heterodera glycines, Heterodera schachtii, Heterodora avenae* and *Heterodora trifolii*), *Globodera* spp. (for example, *Globodera rostochiensis*), *Radopholus* spp. (for example, *Radopholus similes*), *Rotylenchulus* spp., *Pratylenchus* spp. (for example, *Pratylenchus neglectans* and *Pratylenchus penetrans*), *Aphelenchoides* spp., *Helicotylenchus* spp., *Hoplolaimus* spp., *Paratrichodorus* spp., *Longidorus* spp., *Nacobbus* spp., *Subanguina* spp. *Belonlaimus* spp., *Criconemella* spp., *Criconemoides* spp. *Ditylenchus* spp., *Dolichodorus* spp., *Hemicriconemoides* spp., *Hemicycliophora* spp., *Hirschmaniella* spp., *Hypsoperine* spp., *Macroposthonia* spp., *Melinius* spp., *Punctodera* spp., *Quinisulcius* spp., *Scutellonema* spp., *Xiphinema* spp., and *Tylenchorhynchus* spp.

The compositions of the present invention can be used in agricultural lands such as fields, paddy fields, lawns and orchards or in non-agricultural lands. The present invention may be used to control diseases in agricultural lands for cultivating the plants without any phytotoxicity to the plant.

Examples of the crops on which the present compositions may be used include but are not limited to corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica*, colocasia, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, zelkova, Japanese arborvitae, fir wood, hemlock, juniper, *Pinus, Picea*, and *Taxus cuspidate*, etc.

In an embodiment, the constituent of the combination of the present invention may be admixed in ratio of (1-80):(1-80):(1-80):(1:80)

In an aspect, the present invention may provide methods of controlling fungal and/or insecticidal pests at a locus and promoting health of the plant, said method comprising applying a combination comprising:
(a) at least one diamide insecticide;
(b) at least one dithiocarbamate fungicide; and
(c) silicic acid based plant health promoting additive.

In an embodiment, the diamide insecticide, the dithiocarbamate fungicide and the silicic acid based plant health promoting additive may be selected according to any of the preferred embodiments of the combinations described hereinabove.

In an aspect, the present combinations may be used to promote health of the plant, said method comprising applying a combination of:
(a) at least one diamide insecticide;
(b) at least one dithiocarbamate fungicide; and
(c) silicic acid based plant health promoting additive.

In an embodiment, the diamide insecticide, the dithiocarbamate fungicide and the silicic acid based plant health promoting additive may be selected according to any of the preferred embodiments of the combinations described hereinabove.

The combinations of the present invention may be sold as a pre-mix composition or a kit of parts such that individual actives may be mixed before spraying. Alternatively, the kit of parts may contain the dithiocarbamate fungicide and the second and/or third fungicide pre-mixed and the diamide insecticide may be admixed with an adjuvant and the silicic acid based plant health additive packaged separately, such that the three components may be tank mixed before spraying.

The composition of the present invention maybe applied simultaneously as a tank mix or a formulation or may be applied sequentially. The application may be made to the soil before emergence of the plants, either pre-planting or post-planting. The application may be made as a foliar spray at different timings during crop development, with either one or two applications early or late post-emergence.

BRIEF DESCRIPTION OF THE PREFERRED EMBODIMENTS

In exemplary embodiments, some preferred embodiments according to the present invention include the following preferred combinations.

In an embodiment, the present invention may also provide compositions comprising the combinations as exemplified in the table below, and at least one agrochemically acceptable excipient.

| Diamide insecticide | Silicic acid | Multisite fungicide | Second fungicide | Third fungicide |
|---|---|---|---|---|
| Chlorantraniliprole | Metasilicic acid | — | — | — |

-continued

| | | | | |
|---|---|---|---|---|
| Chlorantraniliprole | Orthosilicic acid | — | — | — |
| Chlorantraniliprole | Disilicic acid | — | — | — |
| Chlorantraniliprole | Pyrosilicic acid | — | — | — |
| Cyantraniliprole | Metasilicic acid | — | — | — |
| Cyantraniliprole | Orthosilicic acid | — | — | — |
| Cyantraniliprole | Disilicic acid | — | — | — |
| Cyantraniliprole | Pyrosilicic acid | — | — | — |
| Flubendiamide | Metasilicic acid | — | — | — |
| Flubendiamide | Orthosilicic acid | — | — | — |
| Flubendiamide | Disilicic acid | — | — | — |
| Flubendiamide | Pyrosilicic acid | — | — | — |
| Chlorantraniliprole | Metasilicic acid | Mancozeb | — | — |
| Chlorantraniliprole | Orthosilicic acid | Mancozeb | — | — |
| Chlorantraniliprole | Disilicic acid | Mancozeb | — | — |
| Chlorantraniliprole | Pyrosilicic acid | Mancozeb | — | — |
| Cyantraniliprole | Metasilicic acid | Mancozeb | — | — |
| Cyantraniliprole | Orthosilicic acid | Mancozeb | — | — |
| Cyantraniliprole | Disilicic acid | Mancozeb | — | — |
| Cyantraniliprole | Pyrosilicic acid | Mancozeb | — | — |
| Flubendiamide | Metasilicic acid | Mancozeb | — | — |
| Flubendiamide | Orthosilicic acid | Mancozeb | — | — |
| Flubendiamide | Disilicic acid | Mancozeb | — | — |
| Flubendiamide | Pyrosilicic acid | Mancozeb | — | — |
| Chlorantraniliprole | Metasilicic acid | Folpet | — | — |
| Chlorantraniliprole | Orthosilicic acid | Folpet | — | — |
| Chlorantraniliprole | Disilicic acid | Folpet | — | — |
| Chlorantraniliprole | Pyrosilicic acid | Folpet | — | — |
| Cyantraniliprole | Metasilicic acid | Folpet | — | — |
| Cyantraniliprole | Orthosilicic acid | Folpet | — | — |
| Cyantraniliprole | Disilicic acid | Folpet | — | — |
| Cyantraniliprole | Pyrosilicic acid | Folpet | — | — |
| Flubendiamide | Metasilicic acid | Folpet | — | — |
| Flubendiamide | Orthosilicic acid | Folpet | — | — |
| Flubendiamide | Disilicic acid | Folpet | — | — |
| Flubendiamide | Pyrosilicic acid | Folpet | — | — |
| Chlorantraniliprole | Metasilicic acid | Chlorothalonil | — | — |
| Chlorantraniliprole | Orthosilicic acid | Chlorothalonil | — | — |
| Chlorantraniliprole | Disilicic acid | Chlorothalonil | — | — |
| Chlorantraniliprole | Pyrosilicic acid | Chlorothalonil | — | — |

-continued

| | | | | |
|---|---|---|---|---|
| Cyantraniliprole | Metasilicic acid | Chlorothalonil | — | — |
| Cyantraniliprole | Orthosilicic acid | Chlorothalonil | — | — |
| Cyantraniliprole | Disilicic acid | Chlorothalonil | — | — |
| Cyantraniliprole | Pyrosilicic acid | Chlorothalonil | — | — |
| Flubendiamide | Metasilicic acid | Chlorothalonil | — | — |
| Flubendiamide | Orthosilicic acid | Chlorothalonil | — | — |
| Flubendiamide | Disilicic acid | Chlorothalonil | — | — |
| Flubendiamide | Pyrosilicic acid | Chlorothalonil | — | — |
| Chlorantraniliprole | Metasilicic acid | TBCS | — | — |
| Chlorantraniliprole | Orthosilicic acid | TBCS | — | — |
| Chlorantraniliprole | Disilicic acid | TBCS | — | — |
| Chlorantraniliprole | Pyrosilicic acid | TBCS | — | — |
| Cyantraniliprole | Metasilicic acid | TBCS | — | — |
| Cyantraniliprole | Orthosilicic acid | TBCS | — | — |
| Cyantraniliprole | Disilicic acid | TBCS | — | — |
| Cyantraniliprole | Pyrosilicic acid | TBCS | — | — |
| Flubendiamide | Metasilicic acid | TBCS | — | — |
| Flubendiamide | Orthosilicic acid | TBCS | — | — |
| Flubendiamide | Disilicic acid | TBCS | — | — |
| Flubendiamide | Pyrosilicic acid | TBCS | — | — |
| Chlorantraniliprole | Metasilicic acid | Mancozeb | Cyproconazole | — |
| Chlorantraniliprole | Orthosilicic acid | Mancozeb | Cyproconazole | — |
| Chlorantraniliprole | Disilicic acid | Mancozeb | Cyproconazole | — |
| Chlorantraniliprole | Pyrosilicic acid | Mancozeb | Cyproconazole | — |
| Cyantraniliprole | Metasilicic acid | Mancozeb | Cyproconazole | — |
| Cyantraniliprole | Orthosilicic acid | Mancozeb | Cyproconazole | — |
| Cyantraniliprole | Disilicic acid | Mancozeb | Cyproconazole | — |
| Cyantraniliprole | Pyrosilicic acid | Mancozeb | Cyproconazole | — |
| Flubendiamide | Metasilicic acid | Mancozeb | Cyproconazole | — |
| Flubendiamide | Orthosilicic acid | Mancozeb | Cyproconazole | — |
| Flubendiamide | Disilicic acid | Mancozeb | Cyproconazole | — |
| Flubendiamide | Pyrosilicic acid | Mancozeb | Cyproconazole | — |
| Chlorantraniliprole | Metasilicic acid | Mancozeb | Difenoconazole | — |
| Chlorantraniliprole | Orthosilicic acid | Mancozeb | Difenoconazole | — |
| Chlorantraniliprole | Disilicic acid | Mancozeb | Difenoconazole | — |
| Chlorantraniliprole | Pyrosilicic acid | Mancozeb | Difenoconazole | — |
| Cyantraniliprole | Metasilicic acid | Mancozeb | Difenoconazole | — |
| Cyantraniliprole | Orthosilicic acid | Mancozeb | Difenoconazole | — |
| Cyantraniliprole | Disilicic acid | Mancozeb | Difenoconazole | — |

| | | | | |
|---|---|---|---|---|
| Cyantraniliprole | Pyrosilicic acid | Mancozeb | Difenoconazole | — |
| Flubendiamide | Metasilicic acid | Mancozeb | Difenoconazole | — |
| Flubendiamide | Orthosilicic acid | Mancozeb | Difenoconazole | — |
| Flubendiamide | Disilicic acid | Mancozeb | Difenoconazole | — |
| Flubendiamide | Pyrosilicic acid | Mancozeb | Difenoconazole | — |
| Chlorantraniliprole | Metasilicic acid | Mancozeb | Epoxiconazole | — |
| Chlorantraniliprole | Orthosilicic acid | Mancozeb | Epoxiconazole | — |
| Chlorantraniliprole | Disilicic acid | Mancozeb | Epoxiconazole | — |
| Chlorantraniliprole | Pyrosilicic acid | Mancozeb | Epoxiconazole | — |
| Cyantraniliprole | Metasilicic acid | Mancozeb | Epoxiconazole | — |
| Cyantraniliprole | Orthosilicic acid | Mancozeb | Epoxiconazole | — |
| Cyantraniliprole | Disilicic acid | Mancozeb | Epoxiconazole | — |
| Cyantraniliprole | Pyrosilicic acid | Mancozeb | Epoxiconazole | — |
| Flubendiamide | Metasilicic acid | Mancozeb | Epoxiconazole | — |
| Flubendiamide | Orthosilicic acid | Mancozeb | Epoxiconazole | — |
| Flubendiamide | Disilicic acid | Mancozeb | Epoxiconazole | — |
| Flubendiamide | Pyrosilicic acid | Mancozeb | Epoxiconazole | — |
| Chlorantraniliprole | Metasilicic acid | Mancozeb | Hexaconazole | — |
| Chlorantraniliprole | Orthosilicic acid | Mancozeb | Hexaconazole | — |
| Chlorantraniliprole | Disilicic acid | Mancozeb | Hexaconazole | — |
| Chlorantraniliprole | Pyrosilicic acid | Mancozeb | Hexaconazole | — |
| Cyantraniliprole | Metasilicic acid | Mancozeb | Hexaconazole | — |
| Cyantraniliprole | Orthosilicic acid | Mancozeb | Hexaconazole | — |
| Cyantraniliprole | Disilicic acid | Mancozeb | Hexaconazole | — |
| Cyantraniliprole | Pyrosilicic acid | Mancozeb | Hexaconazole | — |
| Flubendiamide | Metasilicic acid | Mancozeb | Hexaconazole | — |
| Flubendiamide | Orthosilicic acid | Mancozeb | Hexaconazole | — |
| Flubendiamide | Disilicic acid | Mancozeb | Hexaconazole | — |
| Flubendiamide | Pyrosilicic acid | Mancozeb | Hexaconazole | — |
| Chlorantraniliprole | Metasilicic acid | Mancozeb | Tebuconazole | — |
| Chlorantraniliprole | Orthosilicic acid | Mancozeb | Tebuconazole | — |
| Chlorantraniliprole | Disilicic acid | Mancozeb | Tebuconazole | — |
| Chlorantraniliprole | Pyrosilicic acid | Mancozeb | Tebuconazole | — |
| Cyantraniliprole | Metasilicic acid | Mancozeb | Tebuconazole | — |
| Cyantraniliprole | Orthosilicic acid | Mancozeb | Tebuconazole | — |
| Cyantraniliprole | Disilicic acid | Mancozeb | Tebuconazole | — |
| Cyantraniliprole | Pyrosilicic acid | Mancozeb | Tebuconazole | — |
| Flubendiamide | Metasilicic acid | Mancozeb | Tebuconazole | — |
| Flubendiamide | Orthosilicic acid | Mancozeb | Tebuconazole | — |

| | | | | |
|---|---|---|---|---|
| Flubendiamide | Disilicic acid | Mancozeb | Tebuconazole | — |
| Flubendiamide | Pyrosilicic acid | Mancozeb | Tebuconazole | — |
| Chlorantraniliprole | Metasilicic acid | Mancozeb | Tetraconazole | — |
| Chlorantraniliprole | Orthosilicic acid | Mancozeb | Tetraconazole | — |
| Chlorantraniliprole | Disilicic acid | Mancozeb | Tetraconazole | — |
| Chlorantraniliprole | Pyrosilicic acid | Mancozeb | Tetraconazole | — |
| Cyantraniliprole | Metasilicic acid | Mancozeb | Tetraconazole | — |
| Cyantraniliprole | Orthosilicic acid | Mancozeb | Tetraconazole | — |
| Cyantraniliprole | Disilicic acid | Mancozeb | Tetraconazole | — |
| Cyantraniliprole | Pyrosilicic acid | Mancozeb | Tetraconazole | — |
| Flubendiamide | Metasilicic acid | Mancozeb | Tetraconazole | — |
| Flubendiamide | Orthosilicic acid | Mancozeb | Tetraconazole | — |
| Flubendiamide | Disilicic acid | Mancozeb | Tetraconazole | — |
| Flubendiamide | Pyrosilicic acid | Mancozeb | Tetraconazole | — |
| Chlorantraniliprole | Metasilicic acid | Mancozeb | Prothioconazole | — |
| Chlorantraniliprole | Orthosilicic acid | Mancozeb | Prothioconazole | — |
| Chlorantraniliprole | Disilicic acid | Mancozeb | Prothioconazole | — |
| Chlorantraniliprole | Pyrosilicic acid | Mancozeb | Prothioconazole | — |
| Cyantraniliprole | Metasilicic acid | Mancozeb | Prothioconazole | — |
| Cyantraniliprole | Orthosilicic acid | Mancozeb | Prothioconazole | — |
| Cyantraniliprole | Disilicic acid | Mancozeb | Prothioconazole | — |
| Cyantraniliprole | Pyrosilicic acid | Mancozeb | Prothioconazole | — |
| Flubendiamide | Metasilicic acid | Mancozeb | Prothioconazole | — |
| Flubendiamide | Orthosilicic acid | Mancozeb | Prothioconazole | — |
| Flubendiamide | Disilicic acid | Mancozeb | Prothioconazole | — |
| Flubendiamide | Pyrosilicic acid | Mancozeb | Prothioconazole | — |
| Chlorantraniliprole | Metasilicic acid | Mancozeb | — | Azoxystrobin |
| Chlorantraniliprole | Orthosilicic acid | Mancozeb | — | Azoxystrobin |
| Chlorantraniliprole | Disilicic acid | Mancozeb | — | Azoxystrobin |
| Chlorantraniliprole | Pyrosilicic acid | Mancozeb | — | Azoxystrobin |
| Cyantraniliprole | Metasilicic acid | Mancozeb | — | Azoxystrobin |
| Cyantraniliprole | Orthosilicic acid | Mancozeb | — | Azoxystrobin |
| Cyantraniliprole | Disilicic acid | Mancozeb | — | Azoxystrobin |
| Cyantraniliprole | Pyrosilicic acid | Mancozeb | — | Azoxystrobin |
| Flubendiamide | Metasilicic acid | Mancozeb | — | Azoxystrobin |
| Flubendiamide | Orthosilicic acid | Mancozeb | — | Azoxystrobin |
| Flubendiamide | Disilicic acid | Mancozeb | — | Azoxystrobin |
| Flubendiamide | Pyrosilicic acid | Mancozeb | — | Azoxystrobin |

-continued

| | | | | |
|---|---|---|---|---|
| Chlorantraniliprole | Metasilicic acid | Mancozeb | Cyproconazole | Azoxystrobin |
| Chlorantraniliprole | Orthosilicic acid | Mancozeb | Cyproconazole | Azoxystrobin |
| Chlorantraniliprole | Disilicic acid | Mancozeb | Cyproconazole | Azoxystrobin |
| Chlorantraniliprole | Pyrosilicic acid | Mancozeb | Cyproconazole | Azoxystrobin |
| Cyantraniliprole | Metasilicic acid | Mancozeb | Cyproconazole | Azoxystrobin |
| Cyantraniliprole | Orthosilicic acid | Mancozeb | Cyproconazole | Azoxystrobin |
| Cyantraniliprole | Disilicic acid | Mancozeb | Cyproconazole | Azoxystrobin |
| Cyantraniliprole | Pyrosilicic acid | Mancozeb | Cyproconazole | Azoxystrobin |
| Flubendiamide | Metasilicic acid | Mancozeb | Cyproconazole | Azoxystrobin |
| Flubendiamide | Orthosilicic acid | Mancozeb | Cyproconazole | Azoxystrobin |
| Flubendiamide | Disilicic acid | Mancozeb | Cyproconazole | Azoxystrobin |
| Flubendiamide | Pyrosilicic acid | Mancozeb | Cyproconazole | Azoxystrobin |
| Chlorantraniliprole | Metasilicic acid | Mancozeb | Difenoconazole | Azoxystrobin |
| Chlorantraniliprole | Orthosilicic acid | Mancozeb | Difenoconazole | Azoxystrobin |
| Chlorantraniliprole | Disilicic acid | Mancozeb | Difenoconazole | Azoxystrobin |
| Chlorantraniliprole | Pyrosilicic acid | Mancozeb | Difenoconazole | Azoxystrobin |
| Cyantraniliprole | Metasilicic acid | Mancozeb | Difenoconazole | Azoxystrobin |
| Cyantraniliprole | Orthosilicic acid | Mancozeb | Difenoconazole | Azoxystrobin |
| Cyantraniliprole | Disilicic acid | Mancozeb | Difenoconazole | Azoxystrobin |
| Cyantraniliprole | Pyrosilicic acid | Mancozeb | Difenoconazole | Azoxystrobin |
| Flubendiamide | Metasilicic acid | Mancozeb | Difenoconazole | Azoxystrobin |
| Flubendiamide | Orthosilicic acid | Mancozeb | Difenoconazole | Azoxystrobin |
| Flubendiamide | Disilicic acid | Mancozeb | Difenoconazole | Azoxystrobin |
| Flubendiamide | Pyrosilicic acid | Mancozeb | Difenoconazole | Azoxystrobin |
| Chlorantraniliprole | Metasilicic acid | Mancozeb | Epoxiconazole | Azoxystrobin |
| Chlorantraniliprole | Orthosilicic acid | Mancozeb | Epoxiconazole | Azoxystrobin |
| Chlorantraniliprole | Disilicic acid | Mancozeb | Epoxiconazole | Azoxystrobin |
| Chlorantraniliprole | Pyrosilicic acid | Mancozeb | Epoxiconazole | Azoxystrobin |
| Cyantraniliprole | Metasilicic acid | Mancozeb | Epoxiconazole | Azoxystrobin |
| Cyantraniliprole | Orthosilicic acid | Mancozeb | Epoxiconazole | Azoxystrobin |
| Cyantraniliprole | Disilicic acid | Mancozeb | Epoxiconazole | Azoxystrobin |
| Cyantraniliprole | Pyrosilicic acid | Mancozeb | Epoxiconazole | Azoxystrobin |
| Flubendiamide | Metasilicic acid | Mancozeb | Epoxiconazole | Azoxystrobin |
| Flubendiamide | Orthosilicic acid | Mancozeb | Epoxiconazole | Azoxystrobin |
| Flubendiamide | Disilicic acid | Mancozeb | Epoxiconazole | Azoxystrobin |
| Flubendiamide | Pyrosilicic acid | Mancozeb | Epoxiconazole | Azoxystrobin |
| Chlorantraniliprole | Metasilicic acid | Mancozeb | Hexaconazole | Azoxystrobin |
| Chlorantraniliprole | Orthosilicic acid | Mancozeb | Hexaconazole | Azoxystrobin |

| | | | | |
|---|---|---|---|---|
| Chlorantraniliprole | Disilicic acid | Mancozeb | Hexaconazole | Azoxystrobin |
| Chlorantraniliprole | Pyrosilicic acid | Mancozeb | Hexaconazole | Azoxystrobin |
| Cyantraniliprole | Metasilicic acid | Mancozeb | Hexaconazole | Azoxystrobin |
| Cyantraniliprole | Orthosilicic acid | Mancozeb | Hexaconazole | Azoxystrobin |
| Cyantraniliprole | Disilicic acid | Mancozeb | Hexaconazole | Azoxystrobin |
| Cyantraniliprole | Pyrosilicic acid | Mancozeb | Hexaconazole | Azoxystrobin |
| Flubendiamide | Metasilicic acid | Mancozeb | Hexaconazole | Azoxystrobin |
| Flubendiamide | Orthosilicic acid | Mancozeb | Hexaconazole | Azoxystrobin |
| Flubendiamide | Disilicic acid | Mancozeb | Hexaconazole | Azoxystrobin |
| Flubendiamide | Pyrosilicic acid | Mancozeb | Hexaconazole | Azoxystrobin |
| Chlorantraniliprole | Metasilicic acid | Mancozeb | Tebuconazole | Azoxystrobin |
| Chlorantraniliprole | Orthosilicic acid | Mancozeb | Tebuconazole | Azoxystrobin |
| Chlorantraniliprole | Disilicic acid | Mancozeb | Tebuconazole | Azoxystrobin |
| Chlorantraniliprole | Pyrosilicic acid | Mancozeb | Tebuconazole | Azoxystrobin |
| Cyantraniliprole | Metasilicic acid | Mancozeb | Tebuconazole | Azoxystrobin |
| Cyantraniliprole | Orthosilicic acid | Mancozeb | Tebuconazole | Azoxystrobin |
| Cyantraniliprole | Disilicic acid | Mancozeb | Tebuconazole | Azoxystrobin |
| Cyantraniliprole | Pyrosilicic acid | Mancozeb | Tebuconazole | Azoxystrobin |
| Flubendiamide | Metasilicic acid | Mancozeb | Tebuconazole | Azoxystrobin |
| Flubendiamide | Orthosilicic acid | Mancozeb | Tebuconazole | Azoxystrobin |
| Flubendiamide | Disilicic acid | Mancozeb | Tebuconazole | Azoxystrobin |
| Flubendiamide | Pyrosilicic acid | Mancozeb | Tebuconazole | Azoxystrobin |
| Chlorantraniliprole | Metasilicic acid | Mancozeb | Tetraconazole | Azoxystrobin |
| Chlorantraniliprole | Orthosilicic acid | Mancozeb | Tetraconazole | Azoxystrobin |
| Chlorantraniliprole | Disilicic acid | Mancozeb | Tetraconazole | Azoxystrobin |
| Chlorantraniliprole | Pyrosilicic acid | Mancozeb | Tetraconazole | Azoxystrobin |
| Cyantraniliprole | Metasilicic acid | Mancozeb | Tetraconazole | Azoxystrobin |
| Cyantraniliprole | Orthosilicic acid | Mancozeb | Tetraconazole | Azoxystrobin |
| Cyantraniliprole | Disilicic acid | Mancozeb | Tetraconazole | Azoxystrobin |
| Cyantraniliprole | Pyrosilicic acid | Mancozeb | Tetraconazole | Azoxystrobin |
| Flubendiamide | Metasilicic acid | Mancozeb | Tetraconazole | Azoxystrobin |
| Flubendiamide | Orthosilicic acid | Mancozeb | Tetraconazole | Azoxystrobin |
| Flubendiamide | Disilicic acid | Mancozeb | Tetraconazole | Azoxystrobin |
| Flubendiamide | Pyrosilicic acid | Mancozeb | Tetraconazole | Azoxystrobin |
| Chlorantraniliprole | Metasilicic acid | Mancozeb | Prothioconazole | Azoxystrobin |
| Chlorantraniliprole | Orthosilicic acid | Mancozeb | Prothioconazole | Azoxystrobin |
| Chlorantraniliprole | Disilicic acid | Mancozeb | Prothioconazole | Azoxystrobin |
| Chlorantraniliprole | Pyrosilicic acid | Mancozeb | Prothioconazole | Azoxystrobin |

| Cyantraniliprole | Metasilicic acid | Mancozeb | Prothioconazole | Azoxystrobin |
| Cyantraniliprole | Orthosilicic acid | Mancozeb | Prothioconazole | Azoxystrobin |
| Cyantraniliprole | Disilicic acid | Mancozeb | Prothioconazole | Azoxystrobin |
| Cyantraniliprole | Pyrosilicic acid | Mancozeb | Prothioconazole | Azoxystrobin |
| Flubendiamide | Metasilicic acid | Mancozeb | Prothioconazole | Azoxystrobin |
| Flubendiamide | Orthosilicic acid | Mancozeb | Prothioconazole | Azoxystrobin |
| Flubendiamide | Disilicic acid | Mancozeb | Prothioconazole | Azoxystrobin |
| Flubendiamide | Pyrosilicic acid | Mancozeb | Prothioconazole | Azoxystrobin |

These combinations only represent the exemplary embodiments of the present invention and are in no way to be construed as limiting the scope of the invention.

The compositions according to the invention can be applied before or after infection of the useful plants or the propagation material thereof by the fungi.

As demonstrated, the addition of a silicic acid based plant health promoting additive to a combination of dithiocarbamate fungicide and diamide insecticidal compound, greatly improved the disease control as well as improved yield and demonstrated a synergistic effect. The lower the mixture performance in the disease control, the greater the additional benefit of the silicic acid based plant health promoting additive when added to the compositions of the present invention.

In an embodiment, the present invention provides a composition comprising Chlorantraniliprole in an amount of about 45 g/ha; acetamiprid in an amount of about 40 g/ha, methoxyfenozide in an amount of amount of 180 g/ha; and ortho-silicic acid in an amount of about 250-750 g/ha.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

EXAMPLE 1

Trials were conducted to test the efficacy of the combination of Chlorantraniliprole and Orthosilicic acid on controlling fruit borer at different dosages. Table 1 below summarises the result of the trials.

| Sr. No. | Treatments | Dose (gm-ml/ha) | Percent fruit Borer control | | | |
|---|---|---|---|---|---|---|
| | | | A-10 | B-10 | C-10 | Mean |
| 1 | Chlorantraniliprole + OSA | 150 + 750 | 75.11 | 86.10 | 88.12 | 83.11 |
| 2 | Chlorantraniliprole | 150 | 73.8 | 85.4 | 87.8 | 82.33 |
| 3 | OSA | 750 | 2.1 | 3.6 | 4.4 | 3.37 |

Thus, in an embodiment, the present invention provides a combination comprising Chlorantraniliprole and ortho-silicic acid.

In another embodiment, the present invention provides a combination comprising Chlorantraniliprole in an amount of 150 g/ha and ortho-silicic acid in an amount of 750 g/ha.

In an embodiment, the present invention provides a composition comprising the combination as described in any of the above embodiments, and at least one agrochemically acceptable excipient.

In an embodiment, the present invention provides a method of controlling fruit borer comprising applying, to the locus, a combination or a composition as described in any of the above embodiments.

Conclusion

Chlorantraniliprole+OSA at dosage of 150+750 gm/ha showed synergy against control of fruit borer than solo application of Chlorantraniliprole with 83.11% control.

EXAMPLE 2

Trials were conducted to test the efficacy of the combination of Chlorantraniliprole+Mancozeb+Orthosilicic acid on Early Blight control:

TABLE 1

| Sr. No. | Treatments | Dose (gm-ml/ha) | Per Cent Early Blight Control (PDC) | | | |
|---|---|---|---|---|---|---|
| | | | A-10 | B-10 | C-10 | Mean |
| T-1 | Chlorantraniliprole + Mancozeb + OSA | 150 + 1500 + 500 | 75.66 | 78.42 | 80.21 | 78.10 |
| T-2 | Chlorantraniliprole + Mancozeb + OSA | 150 + 2000 + 500 | 78.38 | 81.43 | 83.77 | 81.19 |
| T-3 | Chlorantraniliprole + Mancozeb + OSA | 150 + 1500 + 750 | 76.25 | 79.68 | 81.21 | 79.05 |

TABLE 1-continued

| Sr. No. | Treatments | Dose (gm-ml/ha) | Per Cent Early Blight Control (PDC) | | | |
|---|---|---|---|---|---|---|
| | | | A-10 | B-10 | C-10 | Mean |
| T-4 | Chlorantraniliprole + Mancozeb + OSA | 150 + 2000 + 750 | 79.23 | 83.15 | 87.27 | 83.22 |
| T-5 | Chlorantraniliprole | 150 | 04.52 | 02.39 | 02.76 | 3.22 |
| T-6 | Mancozeb | 2000 | 72.26 | 77.04 | 81.17 | 76.82 |
| T-7 | OSA | 750 | 9.38 | 11.57 | 13.95 | 11.63 |
| T-8 | Untreated control | — | [24.59] | [41.15] | [70.93] | [45.56] |

Conclusion

Chlorantraniliprole+Mancozeb+Ortho Silicic Acid at the dosage of 150+2000+500 showed increased control of Early blight than solo application of Chlorantraniliprole and mancozeb. Therefore, it is concluded that addition of Ortho Silicic Acid act as synergist and increases the effectiveness of the combination of chlorantriniprole+Mancozeb.

Thus, in an embodiment, the present invention provides a combination comprising Chlorantraniliprole, mancozeb and ortho-silicic acid.

Thus, in an embodiment, the present invention provides a combination comprising Chlorantraniliprole in an amount of 150 g-mL/ha, mancozeb in an amount of about 1500 g/ha and ortho-silicic acid in an amount of about 500 g/ha.

In another embodiment, the present invention provides a combination comprising Chlorantraniliprole in an amount of 150 g-mL/ha, mancozeb in an amount of about 2000 g/ha and ortho-silicic acid in an amount of about 500 g/ha.

In an embodiment, the present invention provides a combination comprising Chlorantraniliprole in an amount of 150 g-mL/ha, mancozeb in an amount of about 1500 g/ha and ortho-silicic acid in an amount of about 750 g/ha.

In another embodiment, the present invention provides a combination comprising Chlorantraniliprole in an amount of 150 g-mL/ha, mancozeb in an amount of about 2000 g/ha and ortho-silicic acid in an amount of about 750 g/ha.

In an embodiment, the present invention provides a composition comprising the combination as recited in any of the above embodiments, and at least one agrochemically acceptable excipient.

In an embodiment, the present invention provides a method of controlling early blight comprising applying, to the locus, a combination or a composition as described in any of the above embodiments.

The instant invention is more specifically explained by above examples. However, it should be understood that the scope of the present invention is not limited by the examples in any manner. It will be appreciated by any person skilled in this art that the present invention includes aforesaid examples and further can be modified and altered within the technical scope of the present invention.

The invention claimed is:

1. A combination consisting of
   a. at least one diamide insecticide; and
   b. at least a silicic acid based plant health promoting additive selected from metasilicic acid ($H_2SiO_3$), ortho-silicic acid ($H_4SiO_4$), disilicic acid ($H_2Si_2O_5$), and pyrosilicic acid ($H_6Si_2O_7$), and
   c. optionally mancozeb, folpet, chlorothalonil, tribasic copper sulfate (TBCS), cyproconazole, difenconazole, epoxiconazole, hexaconazole, tebuconazole, tetraconazole, prothioconazole, azoxystrobin, or a combination thereof.

2. The combination as claimed in claim 1, wherein diamide insecticide is selected from broflanilide, chlorantraniliprole, cyantraniliprole, cyclaniliprole, cyhalodiamide, and tetraniliprole.

3. The combination as claimed in claim 1, wherein the silicic acid plant health additive is orthosilicic acid.

4. A combination consisting of chlorantraniliprole, mancozeb, and orthosilicic acid.

\* \* \* \* \*